JOHN V. BARNES
INVENTOR.

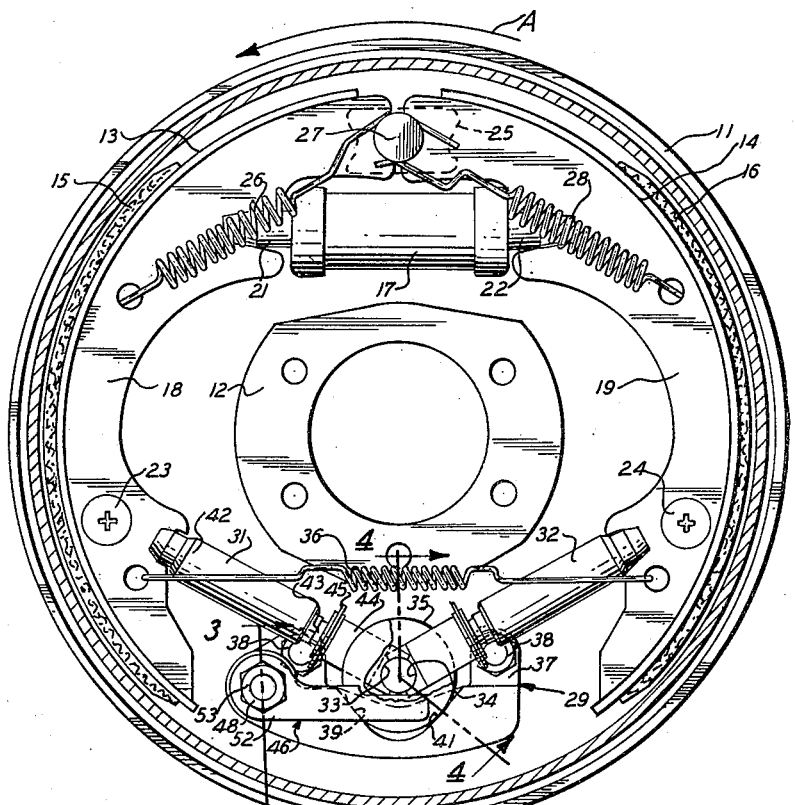
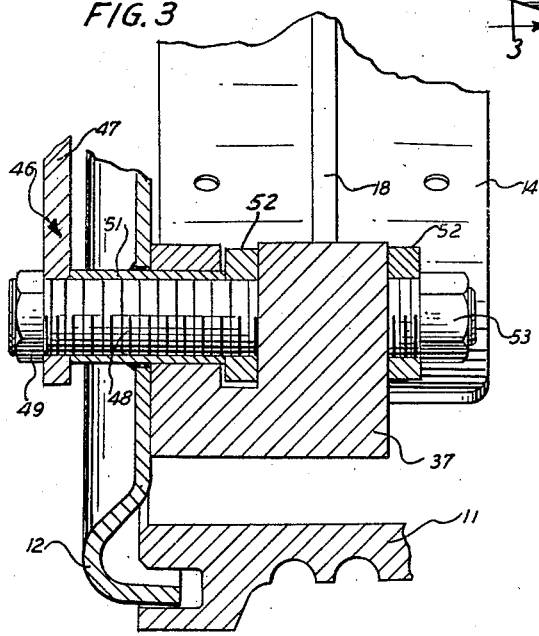
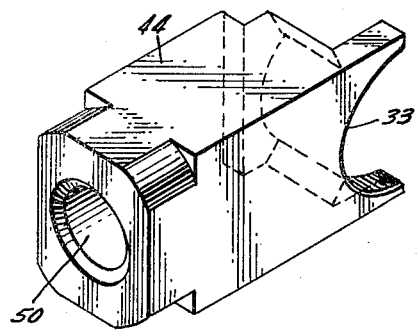
FIG. 1
FIG. 3
FIG. 5
JOHN V. BARNES
INVENTOR.
ATTORNEYS July 13, 1965  J. V. BARNES  3,194,352
BALANCED SHOE BRAKE
Filed Nov. 8, 1961  2 Sheets-Sheet 2

BY

ATTORNEYS

United States Patent Office 3,194,352
Patented July 13, 1965

3,194,352
BALANCED SHOE BRAKE
John V. Barnes, Detroit, Mich., assignor to Ford Motor Company, Dearborn, Mich., a corporation of Delaware
Filed Nov. 8, 1961, Ser. No. 150,992
10 Claims. (Cl. 188—78)

This invention relates to duo servo automotive brakes and more particularly to a force proportioning means that equalizes the loading of the primary and secondary brake shoes during braking action.

The primary and secondary shoes of the conventional duo servo brake are not subjected to equal loading during brake operation. During forward drum rotation in the conventional duo servo brake, the self-energizing force of the primary brake shoe is transmitted directly to the secondary brake shoe by a transfer link interposed between the lower ends of the shoes. There is, however, no transfer of the self-energization force from the secondary brake shoe to the primary brake shoe. The secondary shoe of the conventional brake, therefore, is subjected to the greatest pressure and does the highest proportion of the work in stopping the forward motion of the vehicle. For example, in current production brakes the secondary shoe may provide as much as 90% of the braking force. The pressure distribution across the face of the individual linings is also not uniform. Because of the unequal loading, the effectiveness of the conventional brake is limited by the design of the secondary brake shoe.

It is common practice to utilize a secondary shoe that has a greater lining area and different frictional material than the primary shoe to compensate for the difference in loading of the respective shoes. In addition, the lining material of each shoe is asymmetrically disposed to position the greatest area of material in the local of most stress. This permits a fairly uniform unit stress to be maintained on each of the linings.

The utilization of dissimilar primary and secondary brake shoes has several undesirable aspects. Although the shoes can be designed to permit uniform unit stress of the linings in one direction of drum rotation, the brakes will be unequally loaded during reverse drum rotation resulting in a loss of efficiency. The use of noninterchangeable shoes is also a costly expedient.

It has been proposed to interpose some form of mechanical linkage system between adjacent ends of the brake shoes to balance the forces on the respective shoes. These balancing devices generally consist of a lever or plurality of levers that limit the amount of servo torque transferred from the primary to the secondary shoe through a reduction in mechanical advantage.

Such devices heretofore proposed have proven unsatisfactory for large scale commercial application. Frequently they cannot be adjusted to compensate for wear of the frictional lining material. In other instances, although provision is made for adjustment, the resulting adjustment alters the length of the levers and changes the mechanical advantage. This upsets the balance between the shoes. Often these devices are only operative in one direction of drum rotation. They also make no provision for equally distributing the pressure over the faces of the individual shoe linings.

Therefore, it is the principal object of this invention to provide a duo servo brake assembly that permits the use of interchangeable primary and secondary brake shoes with no loss of brake efficiency and in which both of the brake shoes are loaded equally regardless of the direction of drum rotation.

More specifically it is an object of this invention to provide a force proportioning mechanism for a duo servo brake assembly that maintains a substantially uniform pressure distribution over the face of the individual brake linings.

In one embodiment of this invention a duo servo brake has a rotatable drum and a pair of identical brake shoes. Force applying means are disposed between the shoes contiguous to one end for causing the shoes to move into frictional engagement with the drum. A force proportioning means including a link in engagement with each shoe is interposed between the other end of the shoes. The links are pivotally connected by a member that is constrained for movement in a fixed path. The geometry is such that only a portion of the servo torque of the primary shoe is transmitted to the secondary shoe. The transmitted portion of the servo torque is directed to the secondary shoe in a manner that the pressure on the secondary shoe is balanced equally over the face of its lining. The device is equally effective in both directions of drum rotation. The novel face proportioning mechanism also permits the use of a simplified parking brake.

Further objects and advantages of this invention will become more apparent as this description proceeds particularly when considered in conjunction with the accompanying drawings, wherein:

FIGURE 1 is a cross sectional view of a duo servo brake incorporating the instant invention showing the brake shoes in the retracted position.

FIGURE 3 is a cross sectional view taken along section line 3—3 of FIGURE 1.

FIGURE 4 is a cross sectional view taken along section line 4—4 of FIGURE 1.

FIGURES 5 and 6 are perspective views of the end elements of the link or strut components of the force proportioning mechanism.

Figure 2:
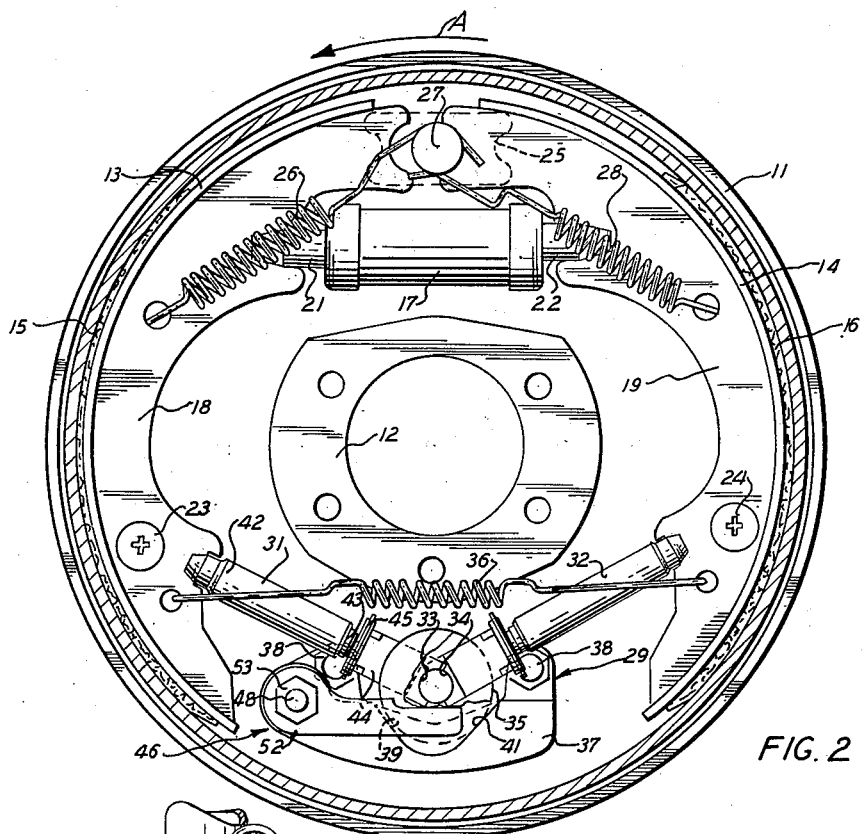
FIGURE 2 is a cross sectional view similar to FIGURE 1 showing the brake shoes in the engaged position.
Figures 4, 6:
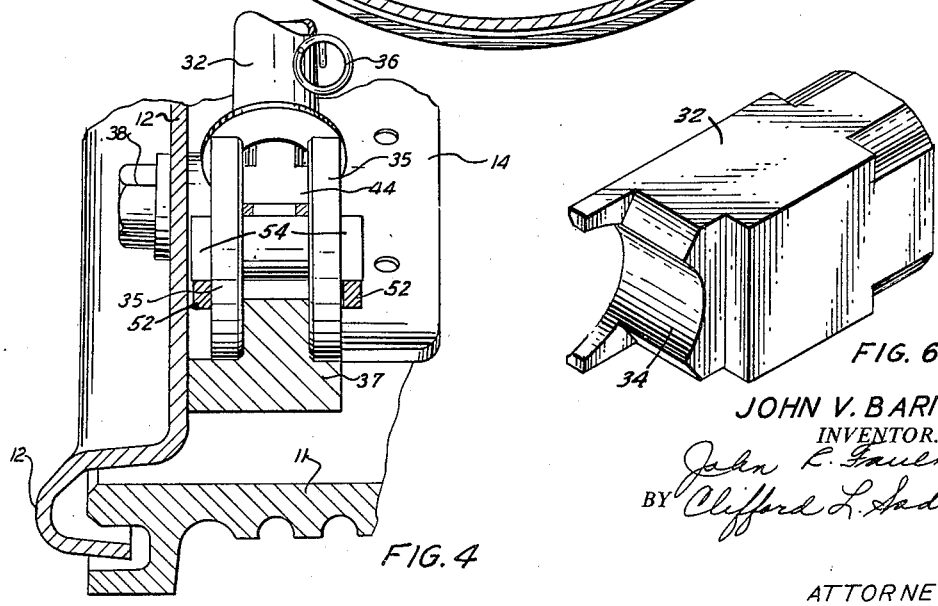

Referring now in detail to the drawings, a rotatably supported brake drum is indicated by the reference numeral 11. Arrow A indicates the direction of rotation of the drum 11 when the vehicle is moving in a forward direction. Supported within the drum 11 on a stationary backing plate 12 are primary and secondary brake shoes 13 and 14. Frictional linings 15 and 16 are bonded, riveted or otherwise secured to the brake shoes 13 and 14, respectively. A hydraulically actuated wheel cylinder 17 acts against reinforcing webs 18 and 19 of the shoes 13 and 14 through plungers 21 and 22 to bring the frictional linings 15 and 16 into contact with the internal surface of the drum 11.

Steady rest spring assemblies 23 and 24 and an anchor pin plate 25 (shown in phantom) bear against the reinforcing webs 18 and 19 to maintain the shoes 13 and 14 in a fixed axial position relative to the backing plate 12. A retraction spring 26 is connected between the web 18 of the primary shoe 13 and an anchor pin 27 that is rigidly secured to the backing plate 12. A retraction spring 28 is also secured between the anchor pin 27 and the web 19 of the secondary shoe 14. The retraction springs 26 and 28 serve to collapse the wheel cylinder 17 and hold the linings 15 and 16 out of engagement with the drum 11 when the brake is not energized. The structure thus far described is conventional.

In accordance with the present invention, means are provided to operatively interconnect the adjacent lower brake shoe ends and to proportion the load distribution therebetween. A force proportioning mechanism, indicated generally at 29, is interposed between the lower ends of the webs 18 and 19 of the shoes 13 and 14 for this purpose. The force proportioning mechanism 29 includes a pair of adjustable length struts 31 and 32. The upper ends of the struts 31 and 32 are forked to receive notched portions of the reinforcing webs 18 and 19 respectively. This connection permits pivotal movement of struts 31 and 32 relative to the webs 18 and 19, however, the servo forces of the shoes 13 and 14 may be transferred through the struts 31 and 32.

The lower ends of the struts 31 and 32 are formed with arcuate portions 33 and 34, respectively, that bear against the cross member of a dumbbell shaped roller member 35.

A tension spring 36 is connected between the reinforcing webs 18 and 19 to urge the webs 18 and 19 into contact with the struts 31 and 32 and the struts 31 and 32 into contact with roller member 35. The connection between the struts 31 and 32 and the roller 35 also permits pivotal movement.

The roller member 35 acts against a reaction member 37 that is secured to the backing plate 12 as by bolts 38. The reaction member 37 has inclined faces 39 and 41 that form a V-shaped track along which the roller member 35 moves. The angle of inclination of the faces 39 and 41 is such that only a portion of the servo torque exerted on one of the shoes is transmitted to the other in a manner that will become more apparent as the description of the operation of this brake proceeds.

*Operation*

When the brake assembly is not energized (FIGURE 1) the retraction springs 26 and 28 and the tension spring 36 hold the linings 15 and 16 out of contact with the drum 11. In this condition, the upper ends of the reinforcing webs 18 and 19 abut the anchor pin 27. The struts 31 and 32 are under compression and the roller member 35 is centered in the bight of the track of the reaction member 37.

When the brake is energized, hydraulic pressure within the wheel cylinder 17 causes the plungers 21 and 22 to move outwardly and urge the linings 15 and 16 of the shoes 13 and 14 into contact with the internal surface of the drum 11 (FIGURE 2). Upon initial engagement with the drum 11, the shoes 13 and 14 tend to rotate slightly in the direction of drum rotation. The upper end of the primary shoe 13 tends to rotate about the strut 31 away from the anchor pin 27 into the drum 11. This creates a self-energizing force on the primary shoe 13 that assists the actuation by the plunger 21. The strut 31 acts as the reaction member for the primary shoe 13, and the entire brake torque of the primary shoe 13 is transferred to the strut 31. This force is transferred, in turn, to the roller member 35 causing it to move up onto the face 41 of the reaction member 47.

The force exerted upon the roller member 35 by the strut 31 is divided into two force components, a first component that is exerted in a normal direction against the face 41 and a second component that is exerted against the strut 32. This latter force is transmitted by the strut 32 to the secondary shoe 14.

The magnitude and direction of the two force components are varied by changing the angle of the face 41. The angular inclination of the face 41 is chosen so that the force transmitted from the primary shoe 13 to the secondary shoe 14 equalizes the total loading on each shoe. The angular disposition of the face 41 also causes the reaction of the forces exerted upon the shoes 13 and 14 to be directed through an area contiguous to their geometric centers. The struts 31 and 32 are pivotally connected at both their ends. Therefore, they can be loaded in compression and along their longitudinal axes only. The struts 31 and 32 are connected to the webs 18 and 19 at a point displaced from the ends of the shoes 13 and 14 so that an extension of the lines of force (the axes of struts 31 and 32) intersect the linings 15 and 16 near their centers rather than at their ends. Substantially uniform unit stresses on the linings 15 and 16 may thereby be maintained. Inasmuch as the force proportioning means 29 is symmetrically disposed to the vertical center line of the brake, the device will be equally effective when the vehicle is moving in a rearward direction.

The struts 31 and 32, as has been noted, have adjustable length. This permits the steady rest position of the shoes 13 and 14 to be adjusted to compensate for wear of the frictional linings 15 and 16. For this purpose, the link 31 may consist of a first member 42 having an internally threaded bore into which is received an externally threaded member 43. Member 43 is rotatably received in a third member 44 having a bore 50 in which is formed the arcuate portion 33 of the strut 31. A member 45 having external teeth is rigidly secured to the member 43. A suitable tool may engage the teeth of member 45 to rotate the member 43 relative to the members 42 and 44 and, accordingly, adjust the length of the strut 31 in the known manner. The strut 32 is similar to construction to the strut 31 and further description is deemed unnecessary.

When adjusting the lengths of the struts 31 and 32, the force transmission ratio of the proportioning mechanism 29 will not be effected inasmuch as the angle of inclination of the faces 39 and 41 is the only factor that affects the proportion of the servo torque that is transferred from one shoe to the other.

It may additionally be desirable to replace the manually adjusted struts 31 and 32 by struts that automatically adjust for wear. The automatic adjusting device illustrated in my copending patent application entitled Automatic Brake Adjustor, Serial Number 140,008, filed September 22, 1961, may be satisfactorily used in conjunction with the force proportioning mechanism here described.

The force proportioning mechanism 29, in addition to its function of limiting the servo force transmitted between the shoes 13 and 14, permits the use of a simplified parking brake assembly indicated generally at 46. The parking brake assembly 46 includes a manually actuated lever 47 that is rigidly secured to a shaft 48 as by a nut 49. The shaft 48 and lever 47 are pivotally supported on the backing plate 12 by a tabular member 51 that is rigidly secured to the backing plate 12. One end of a bifurcated actuating lever 52 is rigidly secured to the inner end of the shaft 48 by a nut 53. The other end of the lever 52 contacts pins 54 extending from the sides of the roller member 35.

To energize the parking brake assembly 46, the lever 47 is rotated in a counterclockwise direction by means of any suitable motion transmitting mechanism (not shown). This causes the shaft 48 and the actuating lever 52 to also rotate in a counterclockwise direction and urge the roller member 35 upward. As the roller member 35 moves upward, the struts 31 and 32 cause the lower end of primary and secondary brake shoes 13 and 14 to pivot outward about the anchor pin 27 into contact with the drum 11. The linings 15 and 16 are thereby brought into engagement with the drum to prevent rotation of the drum 11. The parking brake assembly 46 may be released by rotating the lever 47 in a clockwise direction.

It is to be understood that the invention is not to be limited to the exact construction shown and described but that various changes and modifications may be made without departing from the spirit and scope of the invention as defined by the appended claims.

I claim:

1. A duo servo brake assembly having a rotatable drum, a pair of brake shoes, force applying means interposed between said shoes contiguous to one end thereof for causing said shoes to move into frictional engagement with said drum, and force proportioning means interposed between the other end of said shoes for limiting the amount of servo force transmitted between said shoes, said force proportioning means comprising a first link in pivotal engagement with one of said shoes, a second link in pivotal engagement with the other of said shoes, means pivotally connected to each of said links, and reaction means operative to define a linear path of movement for said last named means.

2. A duo servo brake assembly having a rotatable drum, a pair of brake shoes each having first and second ends, fluid actuated force applying means interposed between said shoes contiguous to said first ends thereof for causing said shoes to move into frictional engagement with said drum, and force proportioning means interposed between said second ends of said shoes for limiting the amount of servo force transmitted between said shoes, said force proportioning means comprising a first link in engagement with one of said shoes, near its second end, a second link in engagement with the other of said shoes near its second end, means pivotally connected to each of said links, reaction means operative to define a path of movement for said last named means, and manually actuated force applying means connected to said last named means for causing said last named means to move and cause said shoes to move into frictional engagement with said drum.

3. A duo servo brake assembly having a rotatable drum, a nonrotatable backing plate, a pair of brake shoes movably supported on said backing plate force applying means interposed between said shoes contiguous to one end thereof for causing said shoes to move into frictional engagement with said drum, and force proportioning means interposed between the other end of said shoes for limiting the amount of servo force transmitted between said shoes, said force proportioning means comprising a first adjustable length strut having one end thereof operatively connected to one of said shoes, a second adjustable length strut having one end thereof operatively connected to the other of said shoes, means pivotally connecting the other ends of said struts, and reaction means operatively connected to said backing plate defining a liner path of movement for said last named means.

4. A duo servo brake assembly having a rotatable drum, a pair of brake shoes, force applying means interposed between said shoes contiguous to one end thereof for causing said shoes to move into frictional engagement with said drum, and force proportioning means interposed between the other end of said shoes for limiting the amount of servo force transmitted between said shoes, said force proportioning means comprising a first link in pivotal engagement with one of said shoes, a second link in pivotal engagement with the other of said shoes, means pivotally connected to each of said links, and a substantially V-shaped track in which said last named means moves.

5. A duo servo brake assembly having a rotatable drum, a nonrotatable backing plate, a pair of brake shoes movably supported by said backing plate, force applying means interposed between said shoes contiguous to one end thereof for causing said shoes to move into frictional engagement with said drum, and force proportioning means interposed between the other end of said shoes for limiting the amount of servo force transmitted between said shoes, said force proportioning means comprising a first adjustable length strut having one end thereof operatively connected to one of said shoes, a second adjustable length strut having one end thereof operatively connected to the other of said shoes, means pivotally connecting the other ends of said struts, and a V-shaped track supported by said backing plate in which said means moves.

6. A duo servo brake assembly having a rotatable drum, a pair of brake shoes, a fluid actuated force applying means interposed between said shoes contiguous to one end thereof for causing said shoes to move into frictional engagement with said drum, and force proportioning means interposed between the other end of said shoes for limiting the amount of servo force transmitted between said shoes, said force proportioning means comprising a first link in engagement with one of said shoes, a second link in engagement with the other of said shoes, means pivotally connected to each of said links, a substantially V-shaped track in which said means moves, and manually actuatable force applying means connected with said last named means for causing said last named means to move and cause said shoes to move into frictional engagement with said drum.

7. A duo servo brake assembly having a rotatable drum, a nonrotatable backing plate, a pair of brake shoes movably supported on said backing plate, brake linings secured to said shoes, force applying means interposed between said shoes contiguous to one end thereof for causing said linings to move into frictional engagement with said drum, and force proportioning means interposed between the other end of said shoes for limiting the amount of servo force transmitted between said shoes, said force proportioning means comprising a first strut having one end thereof operatively connected to one of said shoes, a second strut having one end thereof operatively connected to the other of said shoes, means pivotally connecting the other ends of said struts, and a substantially V-shaped track secured to said backing plate cooperating with said last named means to define a path of movement therefor, the legs of said V-shaped track being disposed in relation to said struts and said shoes to cause the engagement forces on said shoes to be directed through an area contiguous to the geometric center of the lining of each of said shoes.

8. A duo servo brake assembly having a rotatable drum, a nonrotatable backing plate, a pair of brake shoes movably supported by said backing plate, brake linings secured to said shoes, force applying means interposed between said shoes contiguous to one end thereof for causing said linings to move into frictional engagement with said drum, and force proportioning means interposed between the other end of said shoes for limiting the amount of servo force transmitted between said shoes, said force proportioning means comprising a first adjustable length strut having one end thereof operatively connected to one of said shoes, a second adjustable length strut having one end thereof operatively connected to the other of said shoes, means pivotally connecting the other ends of said struts, and a substantially V-shaped track secured to said backing plate cooperating with said last named means to define a path of movement therefor, the legs of said V-shaped track being disposed in relation to said struts and said shoes to cause the engagement forces on said shoes to be directed through an area contiguous to the geometric center of the lining of each of said shoes.

9. A duo servo brake assembly having a rotatable drum, a nonrotatable backing plate, a pair of brake shoes movably supported by said backing plate, brake linings secured to said shoes, force applying means interposed between said shoes contiguous to one end thereof for causing said linings to move into frictional engagement with said drum, and force proportioning means interposed between the other end of said shoes for limiting the amount of servo force transmitted between said shoes, said force proportioning means comprising a first adjustable length strut having one end thereof operatively connected to one of said shoes, a second adjustable length strut having one end thereof operatively connected to the other of said shoes, a roller, a pivotal connection between the other end of each of said struts and said roller, and a substantially V-shaped track secured to said backing plate in which said roller moves, the legs of said V-shaped track being disposed in relation to said struts and said shoes to cause the engagement forces on said shoes to be directed through an area contiguous to the geometric center of the lining of each of said shoes.

10. A duo servo brake assembly having a rotatable drum, a nonrotatable backing plate, a pair of brake shoes movably supported by said backing plate, brake linings secured to said shoes, force applying means interposed between said shoes contiguous to one end thereof for causing said linings to move into frictional engagement with said drum, and force proportioning means interposed between the other end of said shoes for limiting the amount of servo force transmitted between said shoes, said force proportioning means comprising a first adjustable length strut having one end thereof operatively connected to one of said shoes, a second adjustable length strut having one end thereof operatively connected to the other of said shoes, a roller, a pivotal connection between the other end of each of said struts and said roller, a substantially V-shaped track secured to said backing plate in which said roller moves, the legs of said V-shaped track being disposed in relation to said struts and said shoes to cause the engagement forces on said shoes to be directed through an area contiguous to the geometric center of the lining of each of said shoes, and a manually actuated lever pivotally supported by said backing plate, said lever having an outstanding arm thereof in contact with said roller whereby pivotal movement of said lever causes said roller to move to cause said shoes to move into frictional engagement with said drum.

References Cited by the Examiner
UNITED STATES PATENTS

| | | | |
|---|---|---|---|
| 1,678,427 | 7/28 | Flanigan | 188—78 |
| 1,992,207 | 2/35 | Goepfrich | 188—78 |
| 2,140,379 | 12/38 | Carlson et al. | 188—78 |
| 2,173,601 | 9/39 | White | 188—78 |
| 2,246,242 | 6/41 | Chase | 188—78 |
| 2,326,995 | 8/43 | Eksergian | 188—78 |
| 2,348,500 | 5/44 | Sawtelle | 188—78 |
| 2,375,392 | 5/45 | Stelzer | 188—78 |
| 2,657,768 | 11/53 | Hunyady | 188—78 |

EUGENE G. BOTZ, *Primary Examiner.*
A. JOSEPH GOLDBERG, ARTHUR L. LA POINT,
*Examiners.*